United States Patent
Washizawa

(10) Patent No.: US 8,982,436 B2
(45) Date of Patent: Mar. 17, 2015

(54) IMAGE READING APPARATUS, IMAGE READING METHOD AND A PROGRAM FOR MEASURING BLACK AND WHITE REFERENCE DATA

(71) Applicant: Seiko Epson Corporation, Tokyo (JP)

(72) Inventor: Aya Washizawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 96 days.

(21) Appl. No.: 13/766,169

(22) Filed: Feb. 13, 2013

(65) Prior Publication Data

US 2013/0208323 A1 Aug. 15, 2013

(30) Foreign Application Priority Data

Feb. 13, 2012 (JP) ................. 2012-028104

(51) Int. Cl.
- *G03F 3/08* (2006.01)
- *H04N 1/00* (2006.01)
- *H04N 1/407* (2006.01)
- *H04N 1/12* (2006.01)

(52) U.S. Cl.
CPC ......... *H04N 1/00082* (2013.01); *H04N 1/4076* (2013.01); *H04N 1/12* (2013.01); *H04N 2201/044* (2013.01); *H04N 2201/33328* (2013.01)
USPC ........... 358/529; 358/406; 358/516; 358/474; 358/509; 358/505

(58) Field of Classification Search
CPC ... H04N 1/00082; H04N 1/12; H04N 1/4076; H04N 2201/044; H04N 2201/33328
USPC ......... 358/406, 515, 516, 518, 448, 474, 475, 358/483, 520, 480, 504, 505, 509, 510, 498
See application file for complete search history.

(56) References Cited

U.S. PATENT DOCUMENTS

| | | | |
|---|---|---|---|
| 5,970,181 A * | 10/1999 | Ohtsu | 382/274 |
| 6,151,419 A | 11/2000 | Aoki | |
| 2003/0072040 A1 * | 4/2003 | Okamura | 358/474 |
| 2008/0055668 A1 * | 3/2008 | Hirayama | 358/461 |
| 2008/0123163 A1 * | 5/2008 | Nakano et al. | 358/498 |
| 2012/0147439 A1 * | 6/2012 | Taki | 358/448 |

FOREIGN PATENT DOCUMENTS

| | | |
|---|---|---|
| JP | 10-336444 A | 12/1998 |
| JP | 2005-094135 A | 4/2005 |

* cited by examiner

*Primary Examiner* — Benny Q Tieu
*Assistant Examiner* — Quyen V Ngo
(74) *Attorney, Agent, or Firm* — Nutter McClennen & Fish LLP; John J. Penny, Jr.; Joshua I. Rudawitz

(57) ABSTRACT

A carriage motor which is a heat generating device is arranged next to a CIS in a scanner unit. The carriage motor drives respective transport rollers of an ADF unit via a gear system as well. The scanner unit makes a white reference board be read so as to obtain white reference data, and obtains black reference data more frequently than the white reference data, e.g., in a continuous process for reading a document. As a CIS module continues a reading process, the black reference data changes as being affected by a change in temperature in the CIS module, etc. The scanner unit deals with such a change in the black reference data by obtaining the black reference data more frequently.

7 Claims, 4 Drawing Sheets

IMAGE READING APPARATUS, IMAGE READING METHOD AND A PROGRAM FOR MEASURING BLACK AND WHITE REFERENCE DATA

INCORPORATED BY REFERENCE

The entire disclosure of Japanese Patent Application No. 2012-028104, filed Feb. 13, 2012 is expressly incorporated by reference herein.

BACKGROUND

1. Technical Field

The present invention relates to an image reading apparatus, an image reading method and a program.

2. Related Art

An image reading apparatus which stores black reference data in advance, measures only white reference data in time of reading a document, and uses the black reference data having been stored in advance and the measured white reference data for shading correction to image data produced from the read document is proposed in recent years, e.g., as disclosed in JP-A-2005-94135. The apparatus stores the black reference data to be used for shading correction before reading the document so as to further control a delay in starting to read the document.

Incidentally, the image reading apparatus according to JP-A-2005-94135 described above is aimed at carrying out a process for reading a document faster. Black reference data read by an image reading apparatus may conceivably change in some cases depending upon a configuration or a reading method of the image reading apparatus. Thus, enhancement of image quality produced from a read document is desired.

SUMMARY

An advantage of some aspects of the invention is to provide an image reading apparatus, an image reading method and a program which can each enhance image quality further when carrying out a process for reading a document.

The invention is formed by including following sections so as to achieve the above advantage.

An image reading apparatus of the invention includes a transport section configured to transport a document; a reading section configured to read the transported document in a transport reading region; a white reference material arranged at a position to be read by the reading section; and a control section configured to control the transport section and the reading section so as to obtain white reference data by making the reading section read the white reference material and to obtain black reference data more frequently than the white reference data.

The image reading apparatus makes the white reference material be read so as to obtain the white reference data and obtains the black reference data more frequently than the white reference data. The black reference data read by the reading section may conceivably change, e.g., as the reading section continues a reading process. The control section deals with such a change in the black reference data by obtaining the black reference data more frequently. The control section can thereby enhance an image quality further when carrying out a process for reading a document.

The reading section of the image reading apparatus of the invention may adjoin a movable section which moves while generating heat when the reading section reads the document. As the reading section continues a reading process, the movable section generates heat resulting in a change in the black reference data. Thus, the control section can thereby control degradation of the image quality caused by the heat generation further so as to enhance the image quality further. At this time, the movable section may be a driving motor which drives the transport section. As the driving motor generates relatively much heat, the invention is worthy of being applied. At this time, the driving motor may be used as a driving motor which is coupled by a coupling section and drives the transport section so as to move the reading section as well. As the driving motor generates much more heat close to the reading section in such a structure while the document to be read is indispensably being transported, the invention is further worthy of being applied.

The control section of the image reading apparatus of the invention may obtain the black reference data in the transport reading region where the transported document is read. The control section can thereby further shorten a period of time for moving the reading section which may arise as the black reference data is much frequently obtained, and thus can further enhance the image quality while further controlling extension of processing time.

The white reference material of the image reading apparatus of the invention may be arranged opposite the transport reading region over a static reading region where a document being put still is read, and the control section may read the black reference data in the transport reading region. As the reading section thereby moves to the white reference material arranged apart less frequently, the control section can further enhance the image quality while further controlling extension of processing time.

The control section of the image reading apparatus of the invention may obtain the black reference data more frequently by obtaining the black reference data upon a specific period of continuous reading time passing in a process for reading the document. The control section can thereby obtain the black reference data more frequently so as to further enhance the image quality. The specific period of continuous reading time may be determined, e.g., as a period of time in which degradation of an image quality whose relationship with a continuous process for reading a document is empirically obtained stays allowable.

The control section of the image reading apparatus of the invention may control the transport section and the reading section so as to read the document with a plurality of values of resolution including a specific high frequency resolution value, obtain the white reference data and the black reference data when the resolution value with which the document is read excepts the high frequency resolution value, and obtain the black reference data when the resolution value with which the document is read is the high frequency resolution value. The control section can thereby further enhance the image quality while further controlling extension of processing time. The high frequency resolution value may be, e.g., one to be used in a process for reading a document more frequently than other resolution values. The control section can thereby obtain the white reference data less frequently with a resolution value of a high frequency so as to further enhance the image quality while further controlling extension of processing time.

The control section of the image reading apparatus of the invention may control the transport section and the reading section, upon specific low power performance conditions being satisfied, in relevant low power conditions, and obtain the white reference data and the black reference data when returning from the low power conditions. The control section can thereby further enhance the image quality by obtaining new white reference data and black reference data upon returning from the low power conditions.

Incidentally, the image reading apparatus of the invention may have a shading correction running section configured to run shading correction in the process for reading a document by using the white reference data and the black reference data.

An image reading method is one that a computer performs by using an image reading apparatus having a transport section configured to transport a document, the image reading apparatus having a reading section configured to read the transported document in a transport reading region, the image reading apparatus having a white reference material arranged at a position to be read by the reading section. The image reading method includes (a) a step for controlling the transport section and the reading section so as to obtain white reference data by making the reading section read the white reference material and to obtain black reference data more frequently than the white reference data.

According to the image reading method, similarly as to the image reading apparatus described above, the black reference data may conceivably change as the reading section continues a reading process. The image reading apparatus to be used for this method obtains the black reference data more frequently and deals with the change in the black reference data, though, so that the image quality can further be enhanced. Incidentally, various forms of the image reading apparatus described above may be employed for the image reading method. Further, a step for putting each of functions of the image reading apparatus described above into practice may be added to the image reading method.

A program of the invention is such that one or more computers run steps of the image reading method described above. The program may be stored in a computer-readable recording media (e.g., hard disk, ROM, FD, CD, DVD, etc.), may be disseminated from one computer to other computers via a transfer medium (network such as the Internet or a LAN), or may be transmitted and received in any form. If one computer is made run the program or plural computers are made run respective steps into which the program is divided, the respective steps of the image reading method described above are run so that a same effect as that of the image reading method can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
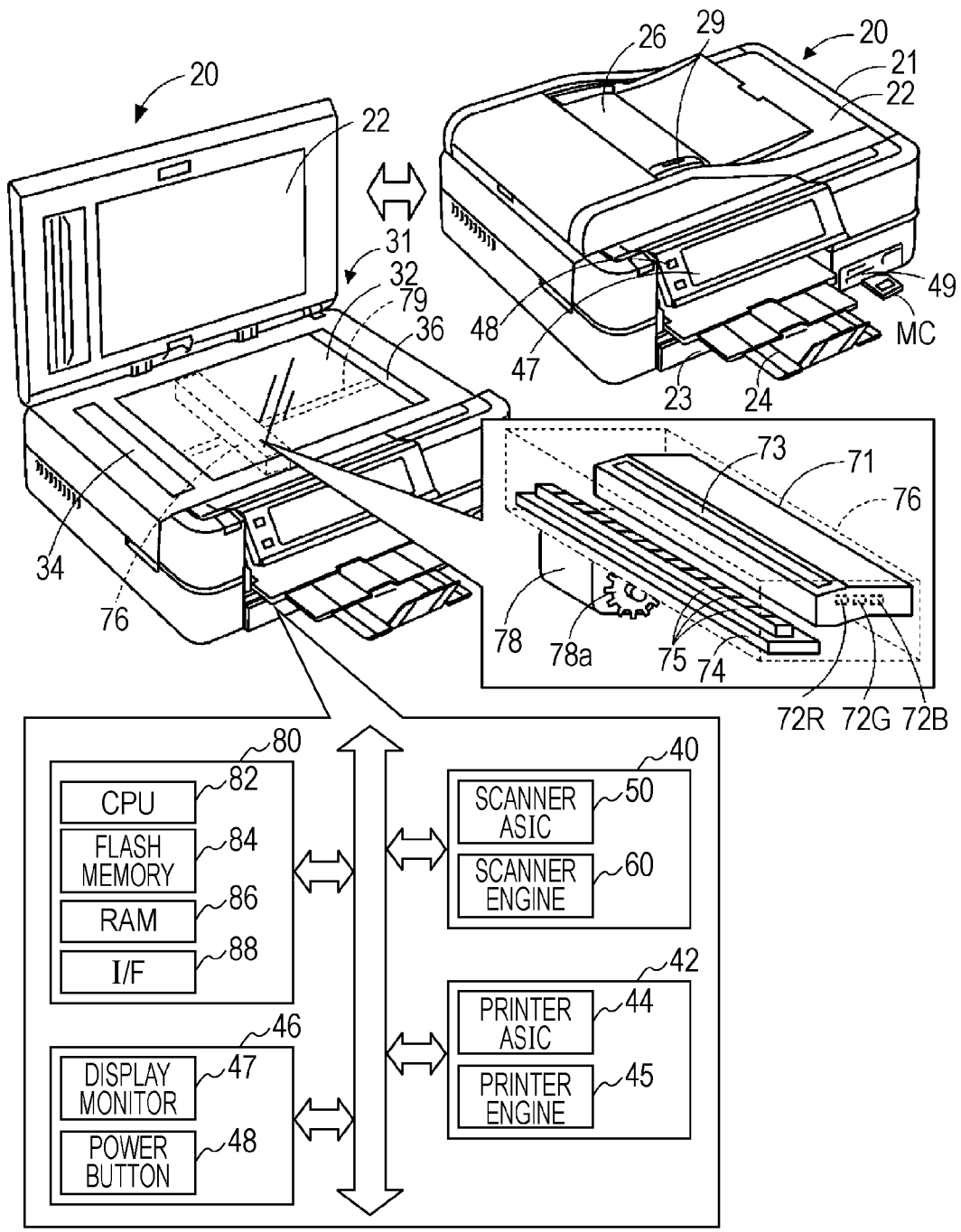
FIG. 1 is a structural diagram which schematically illustrates a structure of a multifunction printer.
Figure 2:
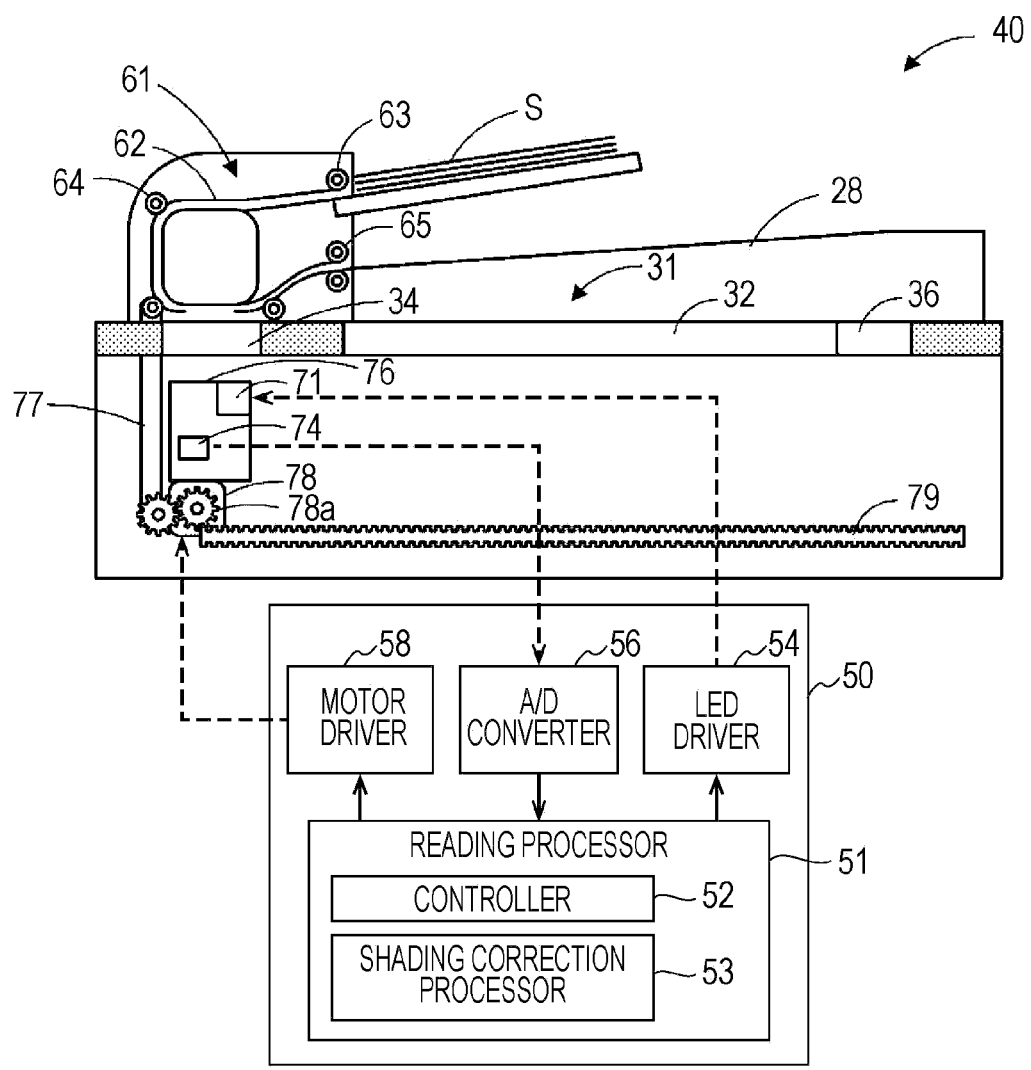
FIG. 2 is a structural diagram which schematically illustrates a structure of a scanner unit.

Then, an embodiment of the invention will be explained by the use of the drawings. FIG. 1 is a structural diagram which schematically illustrates a structure of a multifunction printer 20, an embodiment of the invention. FIG. 2 is a structural diagram which schematically illustrates a structure of a scanner unit 40.

The multifunction printer 20 of the embodiment is formed by a housing 21 and a housing cover 22 which can open or close a top face of the housing 21. The multifunction printer 20 has a scanner unit 40 which optically reads a document and produces image data, a printer unit 42 which feeds paper set in a cassette 23, does printing and ejects paper to a paper ejection tray 24, an operation panel 46 that a user can variously operate, and a main controller 80 which entirely controls the apparatus. The housing 21 is provided with a flatbed portion 31 having a glass plate 32 on the top face. The scanner unit 40 is configured to optically read a document put on the glass plate 32 (this operation mode is called a fixed document reading mode hereafter). Further, the housing cover 22 contains an auto document feeder unit 61 (called ADF unit hereafter) (see FIG. 2), and the scanner unit 40 is configured, while automatically and successively transporting document sheets having been set at an ADF slot 26 along a document guide 29, to optically read the document sheets (this operation mode is called an ADF reading mode hereafter).

The scanner unit 40 has a scanner ASIC 50 and a scanner engine 60. The scanner ASIC 50 is an integrated circuit which controls the scanner engine 60. Upon receiving instructions to scan from the main controller 80, the scanner ASIC 50 controls and instructs the scanner engine 60 to read a document as image data either in the fixed document reading mode or in the ADF reading mode.

The scanner engine 60 has an ADF unit 61 which automatically transports a document S set at the ADF slot 26 into an ADF reading region 34, a light source unit 71 which irradiates the glass plate 32 or the ADF reading region 34 with light, a contact image sensor (CIS) 74 which reads the document S by receiving light reflected by the document S and storing the received light as electric charges, a CIS module 76 on which the light source unit 71 and the CIS 74 are installed, a carriage motor 78 which is fixed below a housing of the CIS module 76 and moves with the CIS module 76 together, a motor gear 78a to be driven to rotate by the carriage motor 78, and a guide gear 79 arranged in a sub scan direction. The motor gear 78a meshes with the guide gear 79, and a move of the CIS module 76 is controlled in the sub scan direction in which the guide gear 79 is arranged. That is, the CIS module 76 is configured to move back and forth in the sub scan direction along the guide gear 79 as being driven by the carriage motor 78. The carriage motor 78 is a stepping motor which moves the CIS module 76 line by line in time of reading by the CIS module 76, and works while generating heat. The carriage motor 78 is arranged next to the CIS 74. The ADF unit 61 has a pickup roller 63 arranged close to the ADF slot 26, a plurality of transport rollers 64 arranged on a transport path 62, and a paper ejection roller 65 arranged close to the ADF paper ejection tray 28. The light source unit 71 has a three-color light source formed by a red LED 72R, a green LED 72G and a blue LED 72B which emit red, green and blue light, respectively, as shown in FIG. 1. The light source unit 71 irradiates the glass plate 32 or the ADF reading region 34 with light coming from the light source via an optical waveguide 73. The CIS 74 is formed by a plurality of photo-detectors (CMOS image sensors) 75 for one line arranged in a main scan direction. The CIS 74 produces color image data by reading reflected light color by color while turning on the LEDs 72R, 72G and 72B of the respective colors alternately one by one.

The scanner engine 60 is configured in such a way that, if the CIS module 76 is placed in the ADF reading region 34 as shown in FIG. 2, a gear system 77 coupled with the respective rollers for transportation such as the pickup roller 63, the transport rollers 64 and the paper ejection roller 65 of the ADF unit 61 meshes with the motor gear 78a. If the carriage motor 78 is driven in the ADF reading region 34 so that the CIS module 76 moves to the left in FIG. 2, the motor gear 78a meshes with nothing on the side of the guide gear 79 and meshes with the gear 77 on the side of the gear 77 so that driving force is transferred to the ADF unit 61. The ADF unit 61 takes in document sheets set at the ADF slot 26 sheet by sheet and automatically transport the document sheets onto the transport path 62 by driving the respective rollers for transportation to rotate by means of the driving force of the carriage motor 78 in this way. That is, the carriage motor 78 is configured to be used as motors for moving the CIS module 76 and for transporting the document S together. The configuration is simplified in this way.

The scanner ASIC 50 has a reading processor 51 which controls respective devices, an LED driver 54 which turns the LEDs 72R, 72G and 72B individually on or off, an A/D converter 56 which is provided with an analog signal produced by the CIS 74 via an amplifier which is not shown and converts the analog signal into a digital signal, and a motor driver 58 which drives the carriage motor 78 upon receiving a control signal from the reading processor 51. The reading processor 51 has a controller 52 and a shading correction processor 53. The controller 52 has a function to obtain white reference data W and black reference data K to be used for shading correction as well as a function of a process for reading the document S. The shading correction processor 53 has a function to carry out a shading correction process. The shading correction process is a series of data processing to remove density unevenness caused pixel by pixel by variation of light emission by the light source unit 71, variation of element by element sensitivity characteristics of the photo-detectors 75, a change in the electric charges dependent on temperature in the CIS 74, etc., by using the black reference data K and the white reference data W (shading correction). The scanner unit 40 has a white reference board 36 arranged opposite the ADF reading region 34 over the glass plate 32 which is a static reading region, i.e., at an end portion in the sub scan direction. The black reference data K is an output voltage obtained by the photo-detectors 75 in case of a scan in condition such that the CIS module 76 is placed in the ADF reading region 34 (or opposite the white reference board 36) and that all light sources are turned off. Further, the white reference data W is an output voltage obtained by the photo-detectors 75 in case of a scan in condition such that the CIS module 76 is placed opposite the white reference board 36 and the LEDs 72R, 72G and 72B of the respective colors are turned on.

The printer unit 42 has a printer ASIC 44 and a printer engine 45. The printer ASIC 44 is an integrated circuit which controls the printer engine 45. Upon being instructed to print by the main controller 80, the printer ASIC 44 controls the printer engine 45 so that an image is printed on a sheet of recording paper on the basis of an image file to be instructed to print. The printer engine 45 is configured to print by emitting ink from a printing head onto a sheet of paper as a color printer mechanism according to a known ink jet system. Incidentally, as the printer unit 42 is not included in the gist of the invention, a further detailed explanation of it will be omitted.

The operation panel 46 has a display monitor 47 arranged in the middle and a power button 48 arranged to the immediate left of the display monitor 47. The display monitor 47 is formed as a liquid crystal display of a touch panel system. The display monitor 47 displays a mode button for mode selection, a selection/setting button for menu or item selection to be touched according to a guidance shown on the display, a start button to start copying or printing, etc., and accepts a touch operation. Modes which can be selected by the use of a mode selection button are a copy mode in which a document put on the glass plate 32 is scanned and copied, a memory card mode in which printing is done by the use of an image stored in a memory card MC that a memory card slot 49 is loaded with or a document is scanned and converted into data to be stored in the memory card MC, a film mode in which a photo film is scanned and printed or data is stored in the memory card MC, etc.

The main controller 80 is formed as a microprocessor centered on a CPU 82, and has a flash memory 84 in which various data processing programs, various kinds of data, various kinds of tables, etc., are stored, a RAM 86 in which scan data or printing data is temporarily stored, and an internal communication interface 88 which enables communication with the operation panel 46. The main controller 80 is configured to be provided with various kinds of operation or detection signals coming from the printer unit 42 or the scanner unit 40, or with an operation signal produced in response to a touch operation done on the operation panel 46. Further, the main controller 80 is configured to read an image file from the memory card MC, to instruct the printer unit 42 to print image data, to instruct the scanner unit 40 to read a document put on the glass plate 32 as image data on the basis of scan instructions coming from the operation panel 46, or to output instructions to control the display monitor 47 to the operation panel 46.

Figure 3:
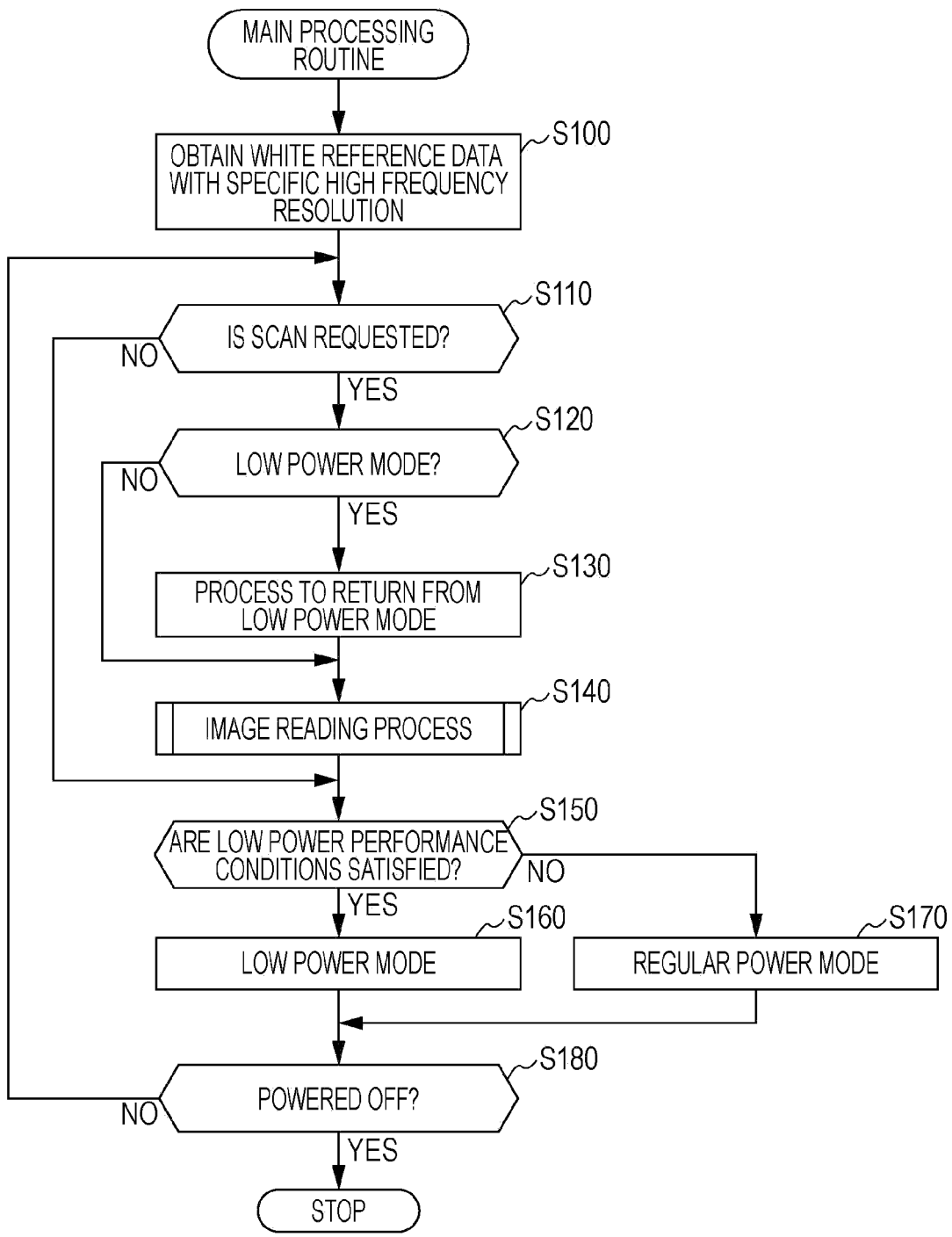
FIG. 3 is a flowchart which shows an exemplary main processing routine.
Figure 4:
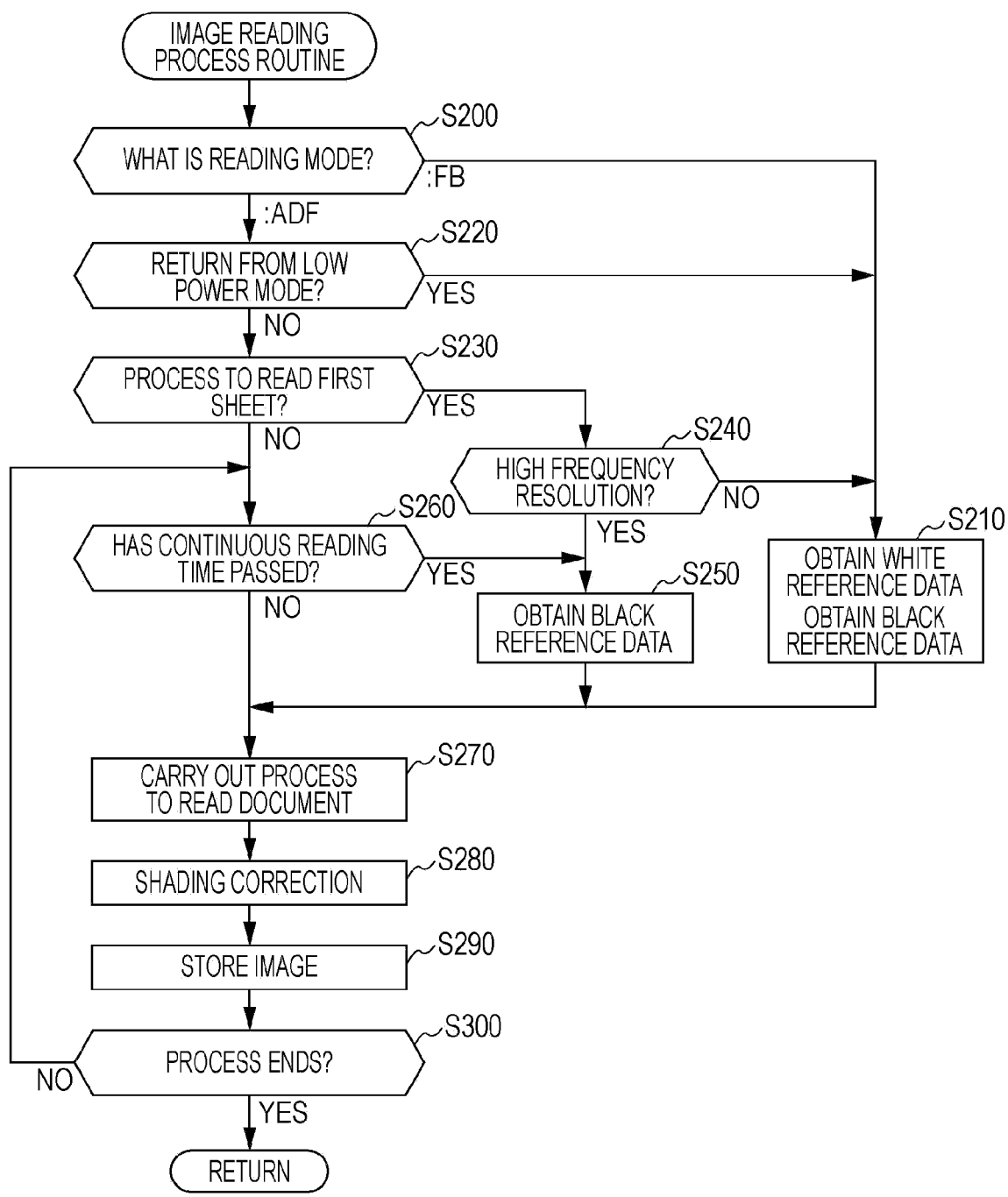
FIG. 4 is a flowchart which shows an exemplary image reading processing routine.

Then, how the scanner unit 40 of the embodiment formed as described above works, particularly in case of a scan in the ADF reading mode, will be explained. FIG. 3 is a flowchart which shows an exemplary main processing routine to be run by the CPU 82 of the main controller 80. FIG. 4 is a flowchart which shows an exemplary image reading processing routine to be run by the scanner ASIC 50. Suppose here, for a main explanation, that a user sets sheets of a document S at the ADF slot 26 and presses a start button which is displayed on the operation panel 46 but is not shown so that the plural sheets of the document S are successively read. The main processing routine is a processing routine to be run by the scanner unit 40, and is run, e.g., after the user presses the power button 48 and the apparatus is powered on.

Upon running the routine, the CPU 82 runs a process for obtaining the white reference data W with a specific high frequency resolution value (step S100). The scanner unit 40 can carry out a process for reading the document S with plural resolution values for reading, e.g., 300, 600, 1200 dpi, etc. Among these resolution values for reading, a resolution value frequently used by the user (e.g., 600 dpi) is specified as a high frequency resolution value. Further, suppose that the scanner unit 40 makes the CIS module 76 move from a home position (on the right of the white reference board 36 in FIG. 2) towards the white reference board 36 in the process for obtaining the white reference data W, and runs a process to read the white reference board 36 by means of the CIS module 76 with light emission by the light source unit 72 together. The white reference data W is stored immediately after the apparatus is powered on as to the frequently used resolution value for reading in this way.

Then, the CPU 82 decides whether or not a scan is requested on the basis of an input signal coming from the operation panel 46 (step S110). If no scan is requested, the CPU 82 decides whether low power performance conditions in which the apparatus shifts into a specific low power mode are satisfied (step S150). The low power mode is a mode for controlling power consumption of the main controller 80, the carriage motor 78, etc., on a side of lower power compared with conditions in which the document S is read. Suppose that the low power performance conditions are satisfied if, e.g., the multifunction printer 20 has not been instructed to print or to scan for a particular period of time (such as two, five or ten minutes). If the low power performance conditions are satisfied, the scanner unit 40 controls the respective units in the low power mode (step S160). Unless the low power performance conditions are satisfied, the scanner unit 40 controls the respective units in a regular power mode (step S170). The CPU 82 decides whether the apparatus is powered off after the step S160 or S170 (step S180). Unless the apparatus is powered off, the CPU 82 carries out the process at and following the step S110.

Meanwhile, if a scan is requested at the step S110, the CPU 82 decides whether a current operation mode is the low power mode (step S120). If it is the low power mode, the CPU 82 carries out a process for returning from the low power mode to the regular power mode (step S130). Then, the scanner unit 40 carries out a process for reading images on the sheets of the document S (step S140), and carries out the process at and following the step S150 described above. Then, the routine ends upon the apparatus being powered off at the step S180.

The image reading process at the step S140 will be explained below in detail. The image reading process is carried out by the use of the respective functions such as the reading processor 51, the controller 52, the shading correction processor 53, the LED driver 54, the A/D converter 56 and the motor driver 58. Upon the routine being carried out, the scanner ASIC 50 decides a reading mode in which the document is read (step S200). If the reading mode is an FB reading mode, the scanner ASIC 50 obtains the white reference data W and the black reference data K (step S210). Suppose here that the scanner ASIC 50 carries out a process for obtaining the white reference data W at a position opposite the white reference board 36 by means of the CIS module 76, and obtaining the black reference data K by means of the CIS module 76 at the same position in dark conditions where no light is radiated. Then, the scanner ASIC 50 carries out a process for reading the document S on the flatbed portion 31 (step S270), carries out shading correction (step S280), and carries out a process for storing obtained image data on which the shading correction and other image processing is done (step S290). Suppose that the shading correction processor 53 carries out a known process for correcting a pixel value read by the CIS 74 by using the white reference data W and the black reference data K in the shading correction process. Then, the scanner ASIC 50 decides whether the process is finished (step S300), and ends the routine upon the process being finished.

Meanwhile, if the reading mode is the ADF reading mode, the scanner ASIC 50 decides whether the apparatus has returned from the low power mode (step S220). If the apparatus has returned from the low power mode, the scanner ASIC 50 carries out the process at and following the step S210, i.e., obtains the white reference data W and the black reference data K and carries out the process for reading the document S. A reason why is that significant time has conceivably passed since the process for reading the document S was carried out last time, and that it is preferable for enhancement of a read image quality to obtain latest white and black reference data K and W. Incidentally, suppose in the process at the step S210 that the scanner ASIC 50 carries out a process for obtaining the white reference data W at the position opposite the white reference board 36 by means of the CIS module 76, then moving the CIS module 76 to the ADF reading region 34 and obtaining the black reference data K in dark conditions where no light is radiated.

Meanwhile, unless the apparatus has returned from the low power mode, the scanner ASIC 50 decides whether a first sheet is currently being read in the process (step S230). If a first sheet is currently being read in the process, the scanner ASIC 50 decides whether the specific high frequency resolution value is applied to the current process for reading the document on the basis of scan setting conditions set by the user (step S240). If the high frequency resolution value is applied, the scanner ASIC 50 obtains the black reference data K (step S250) as having obtained the white reference data W at the step S100 in the main processing routine described above. Suppose here that the CIS module 76 is placed in the ADF reading region 34 and that the scanner ASIC 50 carries out a process for obtaining the black reference data K by means of the CIS module 76 in dark conditions where no light is radiated. Then, the scanner ASIC 50 can carry out a process for reading the document S in the ADF reading region 34 without any change in the conditions. Further, it is unnecessary to move to the white reference board 36 to obtain the white reference data W. Meanwhile, unless the specific high frequency resolution value is applied at the step S240, the scanner ASIC 50 obtains the white reference data W and the black reference data K together at the step S210 as neither white reference data W nor black reference data K is available. Suppose here that the scanner ASIC 50 carries out a process for obtaining the white reference data W at the position opposite the white reference board 36 by means of the CIS module 76, then moving the CIS module 76 to the ADF reading region 34 and obtaining the black reference data K. The scanner ASIC 50 carries out the process at and following the step S270 after the step S250 or S210. That is, the scanner ASIC 50 makes the ADF unit 61 transport the document S, reads the document S by means of the CIS module 76, and carries out a process for producing image data while carrying out shading correction by using the white reference data W and the black reference data K. If the document S include lots of sheets, etc., temperature may rise in the CIS 74 in some cases because of heat generation by the carriage motor 78 arranged close to the CIS 74 and driven when the document S is transported.

Meanwhile, unless a first sheet is currently being read in the process at the step S230, i.e., one of second and following sheets is currently being read in the process, the scanner ASIC 50 decides whether the process for reading the document S has continued for a specific period of continuous reading time and over (step S260). The specific period of continuous reading time may be determined, e.g., as a period of time for which degradation of an image quality whose relationship with a continuous process for reading the document S is empirically obtained stays allowable. Incidentally, the "continuous process for reading the document S" means, e.g., it can be decided that the controller 52 is continuously carrying out the reading process even if temperature inconspicuously falls in the carriage motor 78 in some interval. Then, unless the process for reading the document S has continued for the specific period of continuous reading time and over, the scanner ASIC 50 carries out the process at and following the step S270 by continuously using the previously obtained white reference data W and black reference data K. That is, the scanner ASIC 50 makes the ADF unit 61 transport the document S, read the document S by means of the CIS module 76, and carries out a process for producing image data while carrying out shading correction by using the white reference data W and the black reference data K. Meanwhile, if the process for reading the document S has continued for the specific period of continuous reading time and over at the step S260, the scanner ASIC 50 obtains the black reference data K at the step S250 and carries out the process at and following the step S270. As latest black reference data K is obtained, the scanner ASIC 50 can more certainly correct so called black floating caused by a rise in temperature in the CIS 74 when the carriage motor 78 is continuously driven, etc. Further, as obtaining only the black reference data K, the scanner ASIC 50 can further control the move towards the white reference board 36 and can shorten processing time. The scanner ASIC 50 obtains the black reference data K more frequently than the white reference data W in accordance with heat generation by the carriage motor 78. Then, if the process ends at the step S300, the scanner ASIC 50 ends the routine.

Relationships between the respective portions of the embodiment and portions of the invention corresponding to each other are disclosed below. The ADF unit 61 of the embodiment corresponds to a transport section of the invention. The CIS module 76 corresponds to a reading section. The scanner ASIC 50 corresponds to a control section. The carriage motor 78 corresponds to a movable section. The ADF reading region 34 corresponds to a transport reading region. The glass plate 32 corresponds to a static reading region. Incidentally, an operation of the scanner unit 40 of the embodiment is explained, so that an example of an image reading method of the invention is disclosed.

The scanner unit 40 of the embodiment described above in detail makes the white reference board 36 be read so as to obtain the white reference data W and obtains the black reference data K more frequently than the white reference data W. The black reference data K changes as being affected by a change in temperature in the CIS module 76 as the reading process by the CIS module 76 continues. The scanner unit 40 deals with such a change in the black reference data K by obtaining the black reference data K more frequently. The scanner unit 40 can thereby enhance an image quality further when carrying out a process for reading the document S. Further, the carriage motor 78 which works with heat generation when the document S is read is arranged next to the CIS 74. Although heat generation by the carriage motor 78 causes a change in the black reference data K as the reading process continues, the scanner unit 40 can further enhance the image quality by further controlling degradation of the image quality caused by the heat generation by obtaining the black reference data K more frequently. Further, as the carriage motor 78 generates relatively much heat, the invention is worthy of being applied. Further, as being coupled by the gear system 77 and used as a motor for transporting the document S in the ADF unit 61 as well, the carriage motor 78 generates more heat close to the CIS 74 when the document S is transported. Thus, the invention is further worthy of being applied.

Further, as the black reference data K is obtained in the ADF reading region 34 where the document S is read, it does not take a long time for the CIS module 76 to move which could arise as the black reference data K is obtained. The scanner unit 40 can thereby enhance the image quality further while further controlling extension of the processing time. Further, the white reference board 36 is arranged opposite the ADF reading region 34 over the glass plate 32, and the scanner unit 40 obtains the black reference data K and the white reference data W in the ADF reading region 34 and at the position opposite the white reference board 36, respectively. Thus, the CIS module 76 moves towards the white reference board 36 arranged apart less frequently, and the scanner unit 40 can further enhance the image quality while further controlling extension of the processing time. Still further, while obtaining the white reference data W and the black reference data K when the document is read with resolution excepting the high frequency resolution value, the scanner unit 40 obtains only the black reference data K in case of the high frequency resolution value. The scanner unit 40 can thereby further enhance the image quality while further controlling extension of the processing time in case of the high frequency resolution value. Further, the high frequency resolution value is used in a process for reading a document more frequently than other resolution values. Thus, upon obtaining the white reference data less frequently in a reading process with resolution of a high frequency, the scanner unit 40 can further enhance the image quality while further controlling extension of the processing time. Then, as obtaining the black reference data K if the process for reading the document has continued for the specific period of continuous reading time and over, the scanner unit 40 can further enhance the image quality by obtaining the black reference data K much frequently in a continuous process for reading a document. Still further, as obtaining the white reference data W and the black reference data K when returning from low power conditions, the scanner unit 40 can further enhance the image quality.

Incidentally, it goes without saying that the invention is not at all restricted by the embodiment described above, and that the invention can be put into practice in various forms as long as such a variation stays within the scope of the invention.

It is assumed, e.g., that the carriage motor 78 which generates heat and the CIS 74 of the embodiment described above are arranged next to each other. As long as obtaining the black reference data K more frequently than the white reference data W, the scanner unit 40 is not restricted by such a structure. As the black reference data K sometimes changes because of a factor excepting the heat generation, the scanner unit 40 can further enhance the image quality by obtaining the black reference data K more frequently regardless of whether or not a device which generates heat is next to the CIS module 76.

Although being assumed to obtain the black reference data K in the ADF reading region 34 as to the embodiment described above, the scanner unit 40 is not restricted by such a configuration. The scanner unit 40 may obtain the black reference data K, e.g., at the position opposite the white reference board 36. The scanner unit 40 can thereby enhance the image quality further at the cost of longer processing time. Incidentally, it is more preferable to obtain the black reference data K in the ADF reading region 34 because of shorter processing time.

Although it is assumed that the white reference board 36 is arranged opposite the ADF reading region 34 over the glass plate 32, the scanner unit 40 is not restricted by such a structure. The white reference board 36 may be arranged, e.g., next to the ADF reading region 34. Incidentally, it is more preferable to arrange the white reference board 36 opposite the ADF reading region 34 over the glass plate 32 upon relative home positions, light shielding characteristics and downsizing of the entire apparatus being considered.

Although having one value as to the embodiment described above, the high frequency resolution may have two or more values. Further, the scanner unit 40 may obtain white reference data W of resolution having two or more values at the step S100. Otherwise, the scanner unit 40 may obtain no white reference data W at the step S100. That is, the setting of the high frequency resolution may be omitted.

Although being assumed to obtain the black reference data K if the specific period of continuous reading time has passed as to the embodiment described above, the scanner unit 40 is not restricted by such a configuration upon obtaining the black reference data K more frequently than the white reference data W. Use of the specific period of continuous reading time may be omitted. Even so, the scanner unit 40 can further enhance the image quality by obtaining the black reference data K more frequently.

Although being assumed to obtain the white reference data W and the black reference data K upon returning from the low power conditions, the scanner unit 40 is not restricted by such a configuration. Further, the low power conditions may be omitted.

Although being explained as the multifunction printer 20 of the embodiment described above, the apparatus is not limited to that as long as the apparatus performs shading correction by using the white reference data W and the black reference data K. The apparatus may be, e.g., a scanner apparatus lacking the printer unit 42, or a facsimile apparatus having a facsimile function. Further, although being assumed to be a color printer mechanism according to an ink jet system, the printer unit 42 is not limited to that and may be a color printer of an electronic photo system, a color printer of a dot impact system, or a monochrome printer of those systems.

The multifunction printer 20 of the embodiment is explained above. The embodiment may be similarly explained as an image reading method or a program to carry out the method.

What is claimed is:

1. An image reading apparatus comprising:
    a transport section configured to transport a document;
    a reading section configured to read the transported document in a transport reading region;
    a white reference material arranged at a position to be read by the reading section;
    a control section configured to control the transport section and the reading section so as to obtain white reference data by making the reading section read the white reference material and to obtain black reference data more frequently than the white reference data; and
    wherein the control section controls the transport section and the reading section so as to read the document with a plurality of values of resolution including a specific high frequency resolution value, and the control section obtains the white reference data and the black reference data when the resolution value with which the document is read is a low frequency resolution value which is a lower frequency resolution value than the high frequency resolution value, and obtains the black reference data when the resolution value with which the document is read is the high frequency resolution value.

2. The image reading apparatus according to claim 1, wherein the reading section adjoins a movable section which moves while generating heat when the reading section reads the document.

3. The image reading apparatus according to claim 1, wherein the control section obtains the black reference data in the transport reading region where the transported document is read.

4. The image reading apparatus according to claim 1, wherein the white reference material is arranged opposite the transport reading region over a static reading region in which a document being put still is read, and
    the control section obtains the black reference data in the transport reading region.

5. The image reading apparatus according to claim 1, wherein the control section obtains the black reference data more frequently by obtaining the black reference data upon a specific period of continuous reading time passing in a process for reading the document.

6. The image reading apparatus according to claim 1, wherein the control section controls the transport section and the reading section, upon specific low power performance conditions being satisfied, in relevant low power conditions, and obtains the white reference data and the black reference data when returning from the low power conditions.

7. An image reading method that a computer performs by using an image reading apparatus having a transport section configured to transport a document, the image reading apparatus having a reading section configured to read the transported document in a transport reading region, the image reading apparatus having a white reference material arranged at a position to be read by the reading section, the image reading method comprising:
    transporting a document in the transport section;
    reading the document in the reading section; and
    controlling the transport section and the reading section with the computer so as to obtain white reference data by making the reading section read the white reference material and to obtain black reference data more frequently than the white reference data; and
    controlling the transport section and the reading section so as to read the document with a plurality of values of resolution including a specific high frequency resolution value, and
    obtaining, with the computer. the white reference data and the black reference data when the resolution value with which the document is read is a low frequency resolution value which is a lower frequency resolution value than the high frequency resolution value, and obtains the black reference data when the resolution value with which the document is read is the high frequency resolution value.

* * * * *